US012692986B2

(12) United States Patent
VanOyen

(10) Patent No.: US 12,692,986 B2
(45) Date of Patent: Jul. 28, 2026

(54) FLEX PLATE MOUNT FOR HIGH PRESSURE TANK

(71) Applicant: Quantum Fuel Systems LLC, Lake Forest, CA (US)

(72) Inventor: Hans VanOyen, Lake Forest, CA (US)

(*) Notice: Subject to any disclaimer, the term of this patent is extended or adjusted under 35 U.S.C. 154(b) by 16 days.

(21) Appl. No.: 18/515,132

(22) Filed: Nov. 20, 2023

(65) Prior Publication Data

US 2024/0084973 A1 Mar. 14, 2024

Related U.S. Application Data

(63) Continuation of application No. 17/409,438, filed on Aug. 23, 2021, now Pat. No. 11,828,418, which is a (Continued)

(51) Int. Cl.
*F17C 13/08* (2006.01)

(52) U.S. Cl.
CPC ...... *F17C 13/083* (2013.01); *F17C 2201/032* (2013.01); *F17C 2205/0107* (2013.01);

(Continued)

(58) Field of Classification Search
CPC ........ F17C 2205/0153; F17C 2205/013; F17C 2205/0142; F17C 2205/0107;

(Continued)

(56) References Cited

U.S. PATENT DOCUMENTS 2,761,397 A * 9/1956 Holst ...................... B60P 3/055 280/837
3,479,043 A 11/1969 Piehl (Continued)

FOREIGN PATENT DOCUMENTS

CN 85106738 A 6/1986
CN 101039813 A 9/2007

(Continued)

OTHER PUBLICATIONS

International Patent Application No. PCT/US2020/019077; Int'l Search Report and the Written Opinion; dated Jun. 17, 2020; 13 pages.

(Continued)

*Primary Examiner* — Stephen J Castellano
(74) *Attorney, Agent, or Firm* — BAKER HOSTETLER LLP

(57) ABSTRACT

The present disclosure provides mounting plates having a mounting portion adjacent to a plurality of fastening regions and a flexing portion adjacent to a mounting feature. The fastening regions can be connected to a frame system. The mounting feature can be connected to an end of a pressurized tank. The end of the pressurized tank can move relative to the frame system and the mounting plate can flex such that the flexing portion moves out of the plane of the fastening region to accommodate the motion of the end of the pressurized tank. Connection to the end of the pressurized tank can be provided at a tank collar than can be bonded or threadably connected to the mounting plate via a connection mechanism. The connection mechanism can be an expandable plug or a sleeve that connects to the tank collar.

4 Claims, 17 Drawing Sheets

Related U.S. Application Data continuation of application No. PCT/US2020/019077, filed on Feb. 20, 2020.

(60) Provisional application No. 62/808,814, filed on Feb. 21, 2019.

(52) U.S. Cl.
CPC ................... *F17C 2205/013* (2013.01); *F17C 2205/0192* (2013.01); *F17C 2270/0171* (2013.01)

(58) Field of Classification Search
CPC ....... F17C 2205/0157; F17C 2201/032; Y10T 29/49826
See application file for complete search history.

(56) References Cited

U.S. PATENT DOCUMENTS

| | | | |
|---|---|---|---|
| 4,526,015 | A | 7/1985 | Laskaris |
| 11,828,418 | B2 * | 11/2023 | VanOyen .............. F17C 13/083 |
| 2003/0006349 | A1 | 1/2003 | Sadowski et al. |
| 2004/0075034 | A1 | 4/2004 | Yokote |
| 2014/0299215 | A1 | 10/2014 | Moulik et al. |
| 2014/0319153 | A1 * | 10/2014 | Porterfield ................ F17C 1/00 220/581 |
| 2015/0204482 | A1 * | 7/2015 | Holbeche .............. B65B 31/003 53/403 |

FOREIGN PATENT DOCUMENTS

| | | | |
|---|---|---|---|
| CN | 102126428 | A | 7/2011 |
| CN | 107314237 | A | 11/2017 |
| CN | 207107508 | U | 3/2018 |
| DE | 102015014692 | A1 | 5/2017 |
| DE | 102017214077 | A1 | 2/2019 |
| EP | 0369522 | A2 | 5/1990 |
| JP | 2003-127675 | A | 5/2003 |

OTHER PUBLICATIONS

International Patent Application No. PCT/US2020/019077; Int'l Preliminary Report on Patentability; dated Sep. 2, 2021; 10 pages.

European Patent Application No. 20759875.6; Extended Search Report; dated Oct. 13, 2022; 6 pages.

* cited by examiner

SECTION A-A

SECTION A-A

SECTION A-A

SECTION A-A

SECTION A-A

SECTION A-A

SECTION A-A

SECTION B-B

FLEX PLATE MOUNT FOR HIGH PRESSURE TANK

CROSS-REFERENCE TO RELATED APPLICATIONS

This application is a Continuation of U.S. patent application Ser. No. 17/409,438, filed Aug. 23, 2021, which is a US National Phase of International Application No. PCT/US2020/019077, filed Feb. 20, 2020, titled FLEX PLATE MOUNT FOR HIGH PRESSURE TANK, which claims the benefit of U.S. Provisional Patent Application No. 62/808,814 filed Feb. 21, 2019, the contents of which are incorporated by reference herein in their entirety.

TECHNICAL FIELD

The present disclosure relates to mounting systems, particularly mounting systems suitable for mounting pressurized fluid storage tanks.

BACKGROUND

Compressed fluids are useful in many applications requiring portability. In commercial applications, highly pressurized tanks containing fluids can be mounted on vehicles for use in fueling the vehicle or for transportation to an end-use location or for use as in virtual pipelines that provide fuel for power generation, mining operations, or mobile fuel stations. Such mounting requires structures that can adequately protect the tank from impacts that can damage the tank integrity and potentially result in tank failure. When fluids suitable as fuels are being transported, uncontrolled release of highly pressurized fluid can result in damage to property or injury to people. Accordingly, there is a need for structural mounting solutions that can aid in the safe transportation of highly pressurized tanks on mobile vehicles.

The present disclosure is related to these and other important needs.

SUMMARY

Some systems for mounting cylindrical pressurized tanks utilize one or more straps around the mid-section of a tank, while other systems utilize collars on either end of the cylinder. With the use of collars, one end of the cylinder can be fixed while the other end of the cylinder is mounted with the collar in a floating configuration. A floating collar can allow for tank expansion and contraction as the tank is pressurized and depressurized. Further, the floating collar can accommodate flexing within an overall mounting frame system that retains the tank, as the mounting frame system may be in a mobile system that undergoes vibrations, shocks, and other stresses during transport. Some commercial mounting systems utilize a bushing for the floating configuration, with the tank collar floating within the bushing. The inventors have observed that debris can enter the bushing, which causes it to bind or wear away. When a bushing that has a bind in it, the tank collar cannot freely float and move as the tank expands or contracts. A tank undergoing pressurization or depressurization can break free from the bind in the bushing in a dangerous event as the tank collar forces out the debris and rapidly moves through the floating bushing. Wearing away of the busing over time can result in the need for replacement of the mounting system, and a reduced ability to protect the tank before the need for replacement is discovered.

The present disclosure provides a mounting solution suitable for a use in a collar-mounted tank system. Some implementations of the present disclosure provide systems and methods for flexibly mounting a load, in which the load can move relative to the mounting location. In certain implementations, the load can be a tank or a portion thereof, such as one end of a cylindrical tank. In some implementations the flexible mounting system can allow for as much as 0.5 inches of displacement.

The present disclosure provides mounting plates, the mounting plates comprising a mounting portion adjacent to a plurality of fastening regions, and a flexing portion adjacent to a mounting feature. In some implementations, the mounting plates can further comprise a plurality of flexion pathways formed that lead from the mounting portion to the flexing portion, with each of the plurality of flexion pathways having at least a portion having a cross-sectional area, with the cross-sectional areas of the plurality of flexion pathways being substantially consistent with each other. In certain implementations, the plurality of flexion pathways can be formed by one or more cutaway paths formed from circular end-cuts and linear cuts in combination. In further implementations, the mounting plates can further comprise one or more edge scallop cuts adjacent to the circular end-cuts. In some implementations the plurality of fastening regions can be provided at positions surrounding the mounting feature.

The present disclosure provides pressurized tank retaining structures comprising a mounting plate, a pressurized tank having a tank collar extending therefrom, a connecting mechanism that connects a mounting feature of the mounting plate to the tank collar; and a frame system connected to the mounting plate at a plurality of fastening regions of the mounting plate.

The present disclosure provides methods of mounting a tank to a frame system, the method comprising providing a flex mounting plate having a mounting feature, attaching a sleeve to the mounting feature such that no relative motion between the sleeve and the mounting feature can occur, and connecting the sleeve to a tank collar on the tank such that no relative motion between the sleeve and the tank collar can occur. In certain implementations, the methods can further comprise bonding the sleeve and tank collar together. In other implementations, the methods can further comprise connecting the sleeve and the tank collar with a threaded engagement.

The present disclosure provides methods of mounting a tank to a frame system, the method comprising providing a flex mounting plate having a mounting feature, attaching an expandable plug to the mounting feature such that no relative motion between the expandable plug and the mounting feature can occur, and connecting the expandable plug to a tank collar on the tank such that no relative motion between the expandable plug and the tank collar can occur. In certain implementations, the expandable plug can be connected to the tank collar via engagement with a protrusion within the tank collar by expanding the expandable plug by tightening a pin feature that pulls an expander element into a segmented portion of the expandable plug.

BRIEF DESCRIPTION OF THE DRAWINGS

The summary, as well as the following detailed description, is further understood when read in conjunction with the appended drawings. For the purpose of illustrating the disclosure, there are shown in the drawings exemplary implementations of the disclosure; however, the disclosure is not limited to the specific methods, compositions, and devices disclosed. In addition, the drawings are not necessarily drawn to scale. In the drawings.

In the figures, like reference numerals designate corresponding parts throughout the different views. All descriptions and callouts in the Figures are hereby incorporated by this reference as if fully set forth herein.

DETAILED DESCRIPTION OF ILLUSTRATIVE EMBODIMENTS

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular exemplars by way of example only and is not intended to be limiting of the claimed disclosure. Also, as used in the specification including the appended claims, the singular forms “a,” “an,” and “the” include the plural, and reference to a particular numerical value includes at least that particular value, unless the context clearly dictates otherwise. The term “plurality”, as used herein, means more than one. When a range of values is expressed, another exemplar includes from the one particular value and/or to the other particular value. Similarly, when values are expressed as approximations, by use of the antecedent “about,” it will be understood that the particular value forms another exemplar. All ranges are inclusive and combinable.

Figure 1:
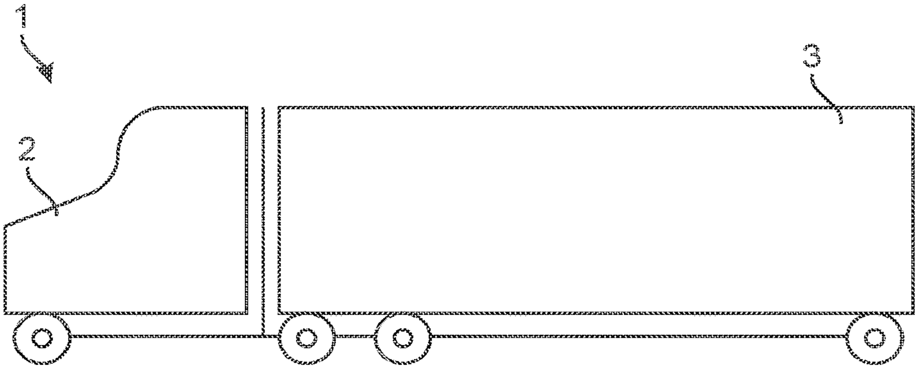
FIG. 1 shows schematically some aspects of pressurized tank retaining structures of the present disclosure.

FIG. 1 schematically shows an exemplary virtual pipeline trailer system 1 that can incorporate the mounting systems of the disclosure. System 1 can include a tractor unit 2 and a semi-trailer or trailer 3. Trailer 3 can be used to contain and transport a plurality of pressurized tanks 10, as shown schematically in FIGS. 2-5.

Figure 2:
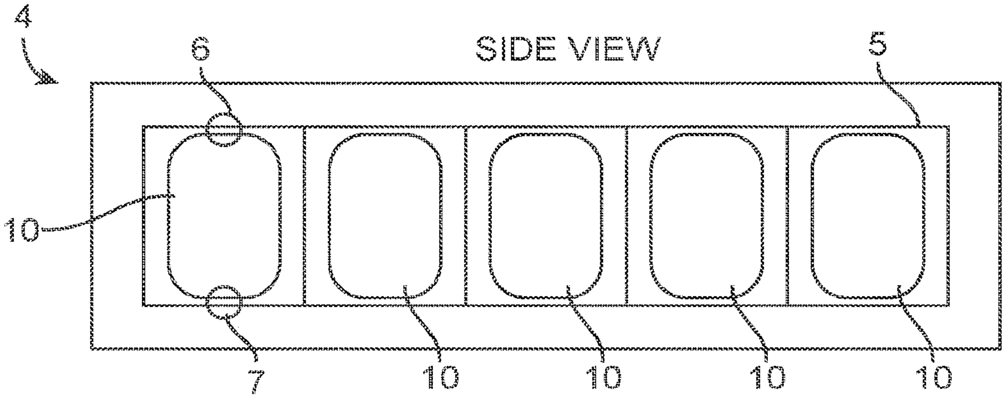
FIG. 2 shows schematically a side view of a trailer component, which illustrates some aspects of implementations of pressurized tank retaining structures of the present disclosure.
Figure 4:
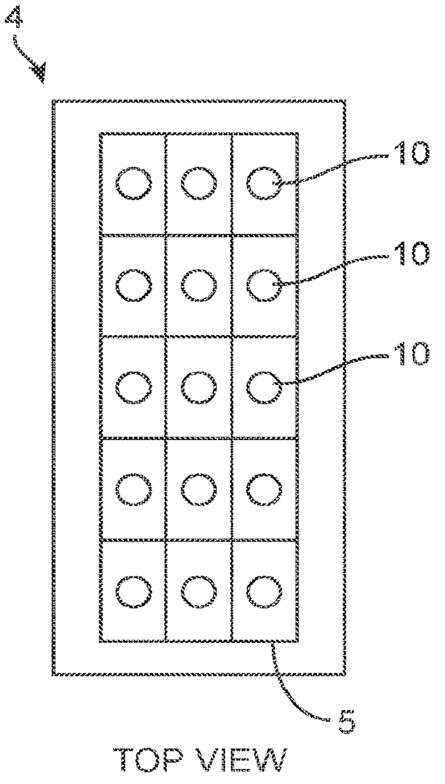
FIG. 4 shows schematically a top view of a trailer component, which illustrates some aspects of implementations of pressurized tank retaining structures of the present disclosure.

FIG. 2 shows a side view of a trailer 4, which is an implementation of trailer 3. Trailer 4 provides for vertically mounted cylindrical pressurized tanks 10 within a frame system 5. The tanks 10 can be mounted with a fixed end 6 and a floating end 7 relative to the frame system 5. FIG. 4 shows a top view of trailer 4, which can have a plurality of rows and columns of the plurality of tanks 10. Frame system 5 is shown schematically and connections of fluid piping, monitoring and safety components going to and from the tanks 10 are omitted for clarity. Mounting connections from the frame system 5 have been omitted from FIGS. 2 and 4 for clarity.

Figure 3:
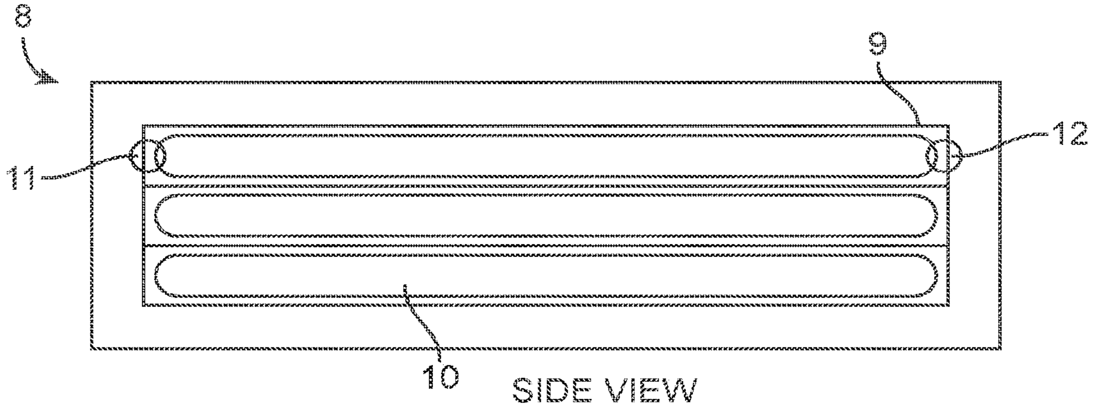
FIG. 3 shows schematically a side view of a trailer component, which illustrates some aspects of implementations of pressurized tank retaining structures of the present disclosure.
Figure 5:
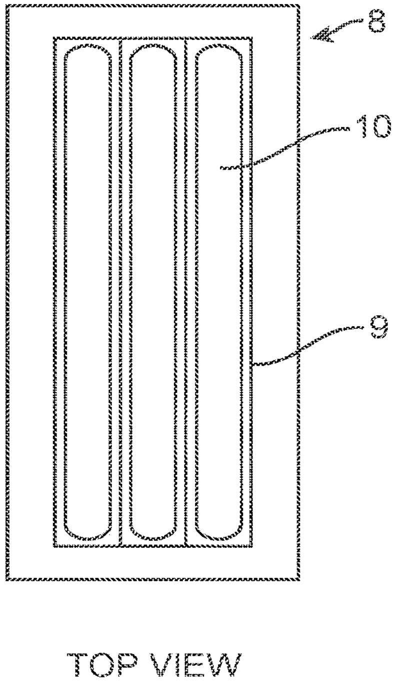
FIG. 5 shows schematically a top view of a trailer component, which illustrates some aspects of implementations of pressurized tank retaining structures of the present disclosure.

FIGS. 3 and 5 show a trailer 8, which is an implementation of trailer 3. Trailer 8 provides for horizontally mounted cylindrical pressurized tanks 10 within a frame system 9. The tanks 10 can be mounted with a fixed end 11 and a floating end 12 relative to the frame system 9. FIG. 3 shows a side view of trailer 8 and FIG. 5 shows a top view of trailer 8, which can have a plurality of rows and columns of the plurality of tanks 10. Frame system 9 is shown schematically and connections of fluid piping, monitoring and safety components going to and from the tanks 10 are omitted for clarity. Mounting connections from the frame system 9 have been omitted from FIGS. 3 and 5 for clarity.

Figure 6:
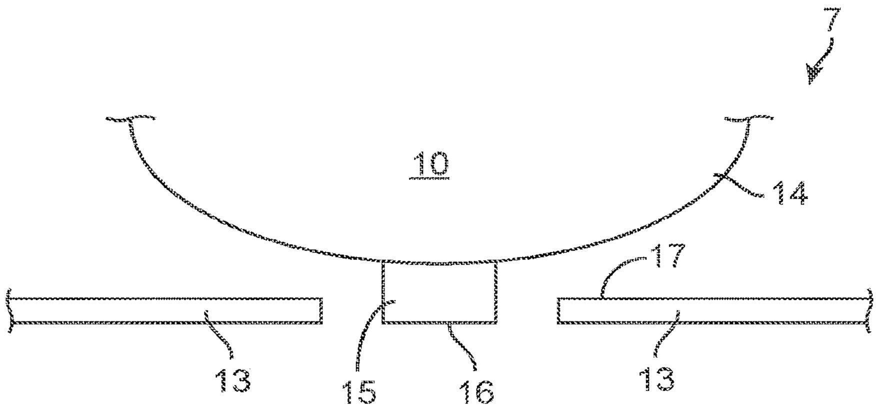
FIG. 6 shows schematically some aspects of pressurized tank retaining structures of the present disclosure.

FIG. 6 shows a schematic of some of the components in an implementation of a floating end 7. Tank 10 has a cylindrical end region 14 having a tank collar 15 extending therefrom. As tank 10 expands under pressurization, tank collar 15 will be extended further downwards, away from the opposing fixed end 6 not shown in FIG. 6, such that the end surface 16 is displaced relative to a surface 17 of the mounting frame portions 13. The displacement distance between surfaces 16 and 17 can change as much as 0.5 inches depending upon the pressurization level in the tank 10, temperatures in the system, and the flexing state of the frame system 5 that can result from vibrations, shocks, or other stress loading. Tank collar 15 extends through a void between mounting frame portions 13 to allow for relative motion.

Figure 7:
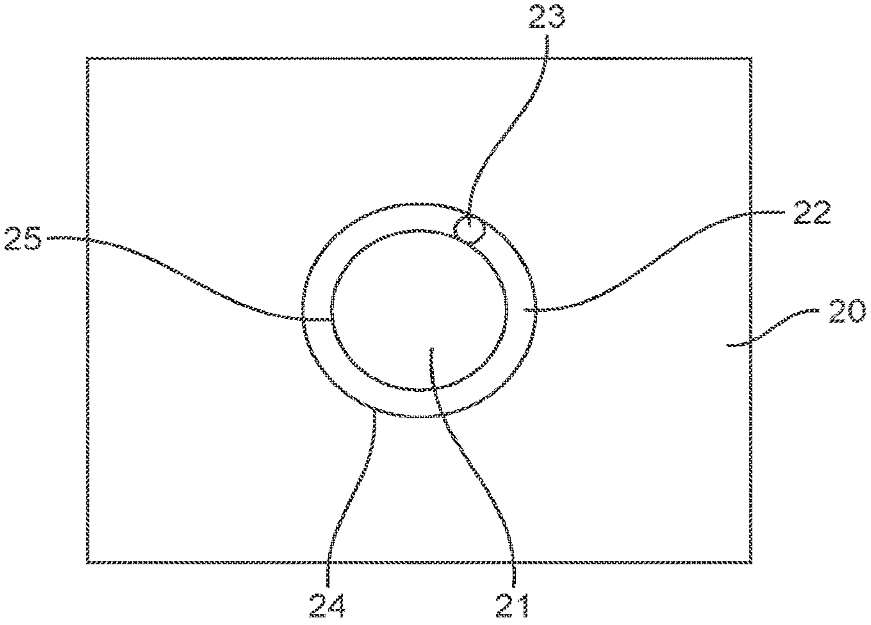
FIG. 7 shows schematically some aspects of pressurized tank retaining structures of the present disclosure.

In order to adequately retain the tank 10 to comply with safety standards and requirements, the tank collar of the floating end can be retained and stabilized against displacements orthogonal to the central axis of the tank 10. FIG. 7 shows a top view of a section view through the plane of connection between a tank collar and mounting system, showing aspects of a bushing retention system for a floating end. A mounting plate 20, which can be connected to a frame system or an integral portion of a frame system, has a central opening with a bushing surface 24 disposed around the external surface 25 of a tank collar 21. Tank collar 21 can be displaced relative to the mounting plate 20, i.e. into and out of the page as FIG. 7 is viewed. It has been observed by the inventor that debris can become trapped in a space or gap 22 between surfaces 24 and 25. Debris 23 can bind the surfaces 24 and 25 such that the tank collar cannot freely float and be displaced relative to each other. The binding between the surfaces 24 and 25 can be abruptly broken during pressurization and depressurization events such that a dangerous dislodging can occur. Further, repeated motion with debris 23 trapped between surfaces 24 and 25 can wear away the surfaces 24 and 25. This is particularly problematic in the environments in which pressurized tanks 10 are used for fueling in areas where there is little or no infrastructure.

The inventor has discovered that mounting systems can be provided that do not have surfaces that undergo repeated relative motion between the surfaces. Implementations of these mounting systems, described herein, can avoid the wear due to debris and can avoid abrupt unbinding events that can be dangerous to personnel in the surrounding area.

Figure 8B:
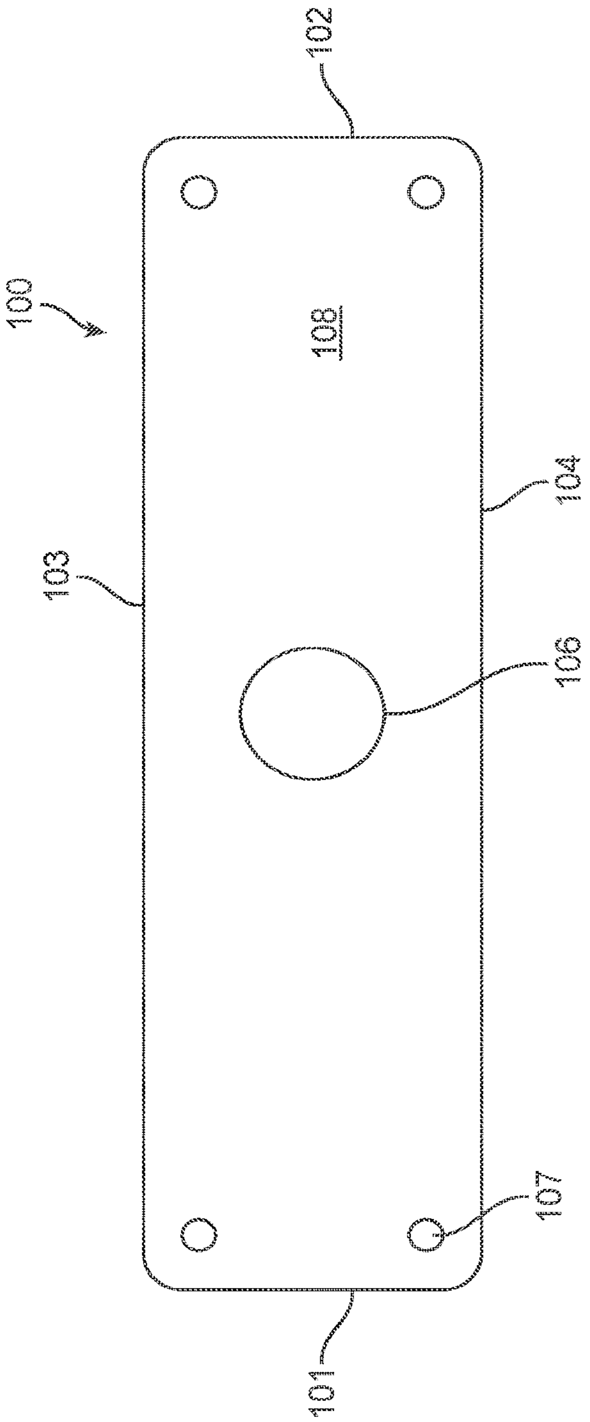
FIGS. 8A, 8B, and 8C shows schematically some aspects of an implementation of a mounting plate of the present disclosure.
Figure 8A:
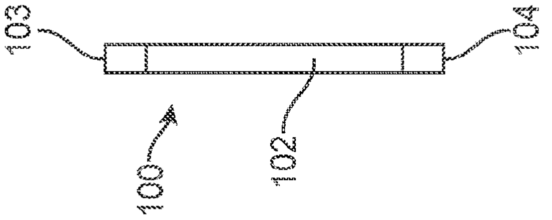
Figure 8C:
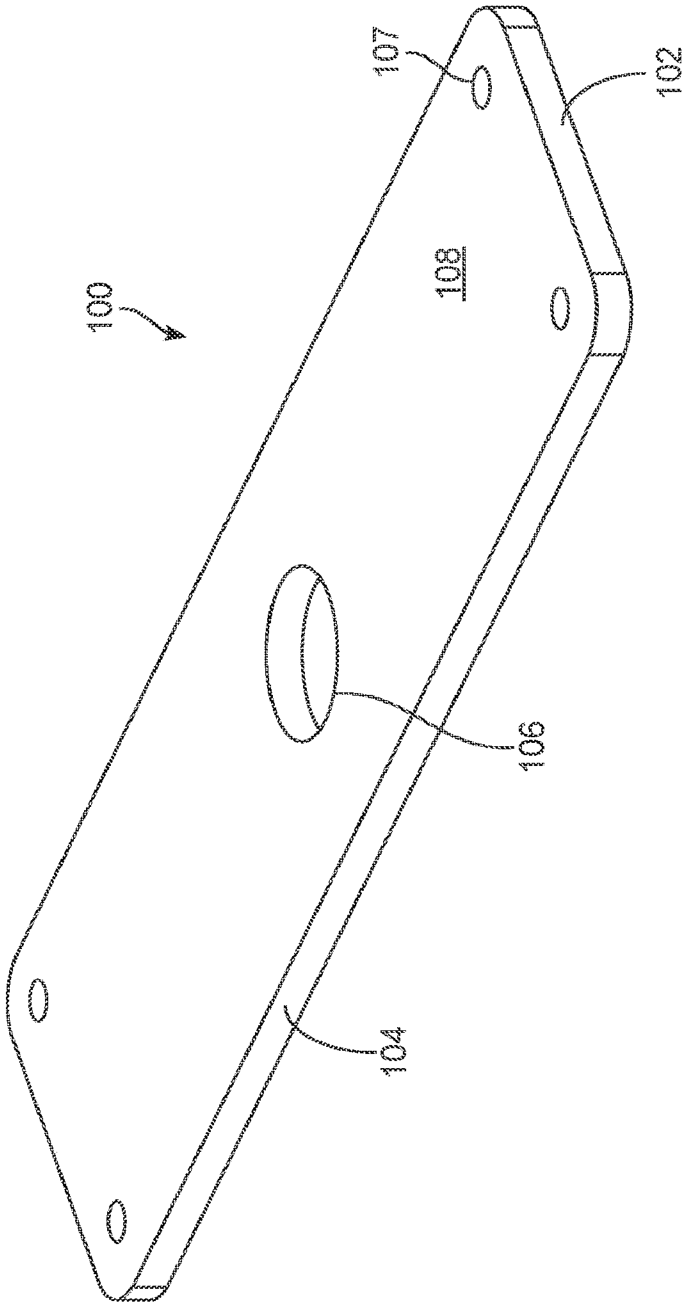

FIGS. 8A, 8B, and 8C show aspects of an implementation of a flex mounting plate 100 that can be used in the mounting systems of the present invention. Flex mounting plate 100 can be used in the floating ends 7 and 12 in connection with the frame systems 5 and 9 described elsewhere herein. Flex mounting plate 100 can be mounted across a void in a frame system, such that a central portion of flex mounting plate 100 can be displaced relative to mounting portions around fastening regions 107. A plurality of fastening regions 107 can be provided and used to secure the flex mounting plate 100 to one or more mounting frame portions with a frame system that is configured to hold a pressurized tank 10. A central mounting region 106 is provided to secure the tank collar in the floating end configuration. The tank collar, not shown in FIGS. 8A, 8B, and 8C, can be secured with no relative motion with respect to the central mounting region 106. The connection with no relative motion can be provided with any connection structure that securely connects the tank collar to the flex mounting plate 100. In this fashion, a cylindrical tank 10 can expand and contract along its central axis via a flexing of the flex mounting plate. The central portion of flex mounting plate, i.e. the region closest to central mounting region 106 can move relative to the exterior portions of the flex mounting plate nearest to edges 101, 102, 103, and 104. This motion can be the central portion moving into and out of the page when viewing FIG. 8B, such that the surface 108 would not be completely planar and flat. The flex mounting plate 100 could be used in the floating end 7 shown in FIG. 6, by having the flex mounting plate 100 affixed to the mounting frame portions 13 by the fastening regions 107. In some implementations, bolts and nuts could be used with through-hole implementations of regions 107 to fasten the flex mounting plate to a matching pattern of holes in mounting frame portions 13. Appropriate fasteners and surface treatments known in the art can be used to avoid disconnections due to vibration in the system.

Figure 9A:
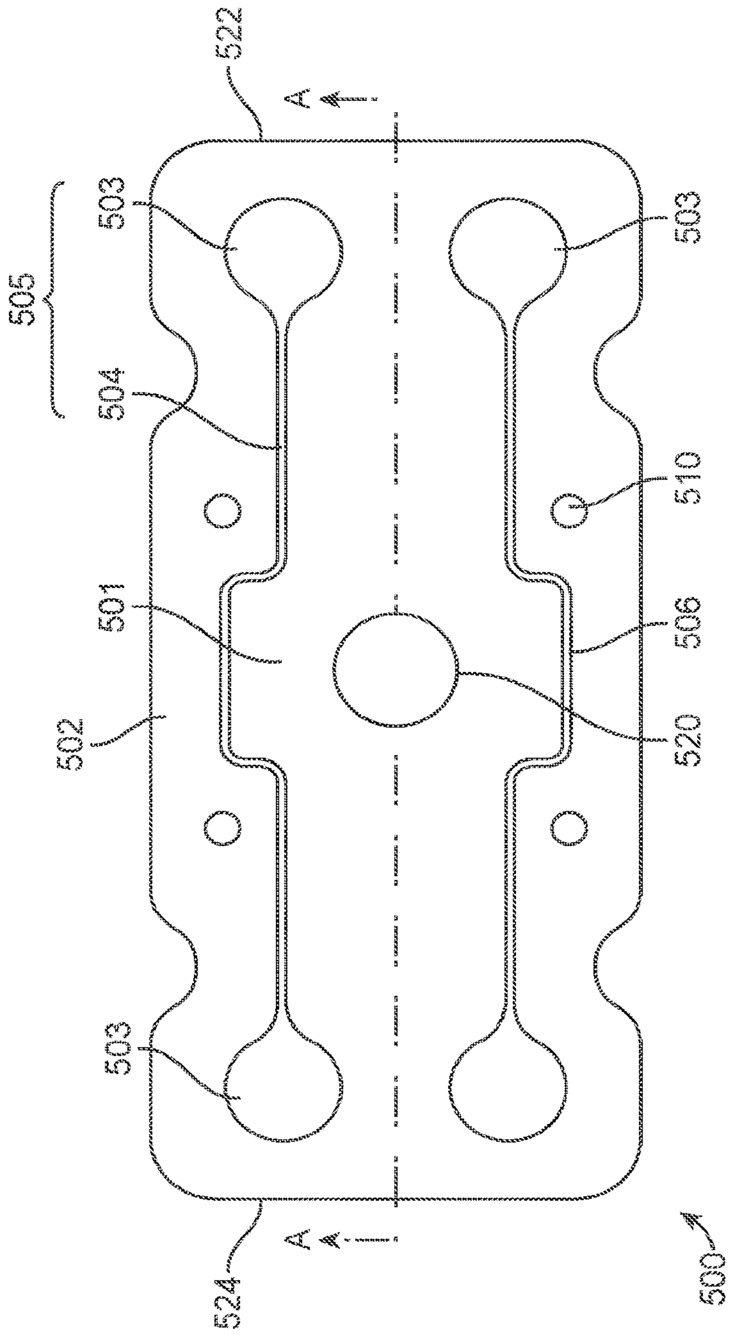
FIGS. 9A, 9B, and 9C shows schematically some aspects of an implementation of a mounting plate of the present disclosure.
Figure 9B:
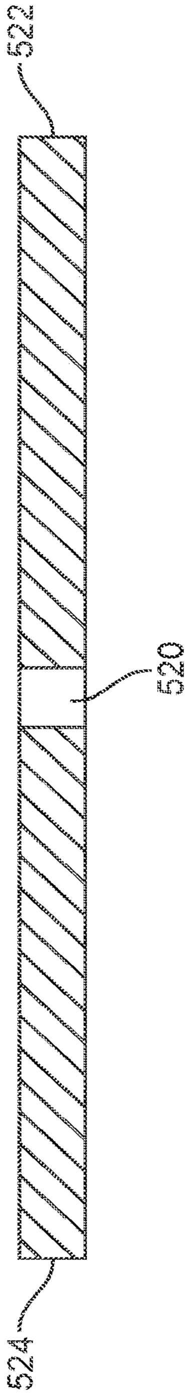
Figure 9C:
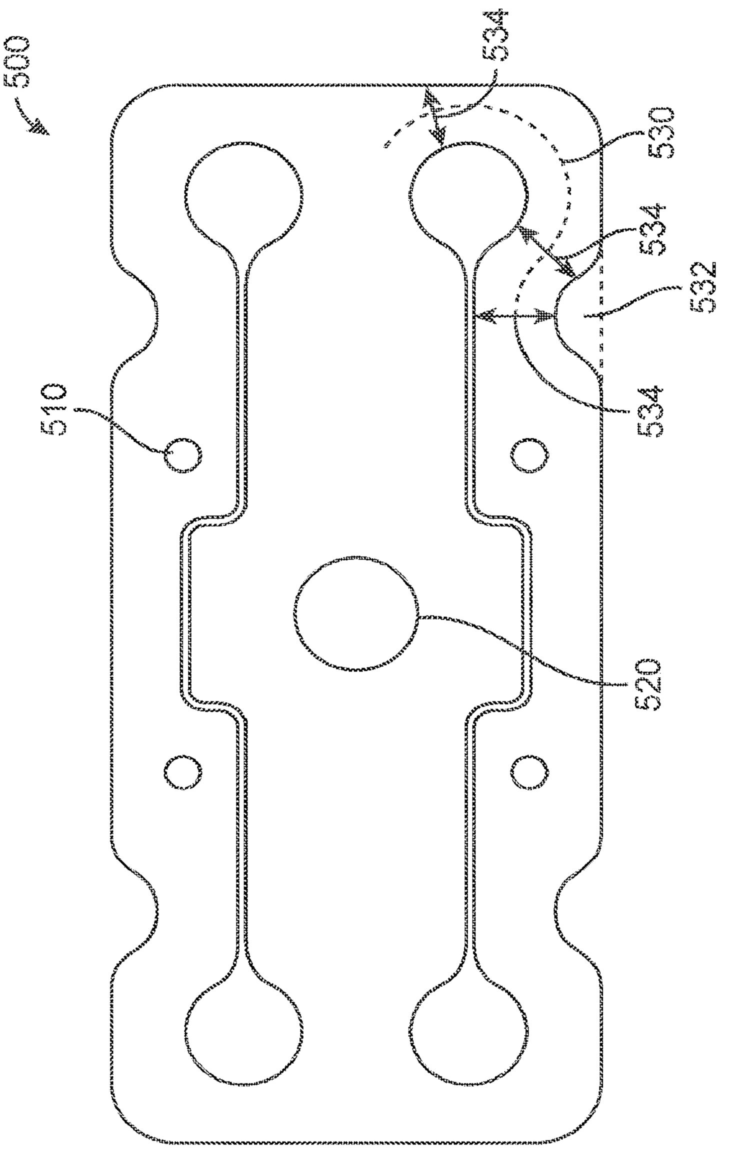

FIGS. 9A, 9B, and 9C show aspects of implementations of a flex mounting plate 500. Flex mounting plate 500 can be used in the floating ends 7 and 12 in connection with the frame systems 5 and 9 described elsewhere herein. Flex mounting plate 500 can in line with a void in a frame system that is in line with the tank collar of a cylindrical tank 10, such that a central portion 501 around a mounting feature 520 of flex mounting plate 500 can be displaced relative to mounting portions around fastening regions 510. Flex mounting plate 500 can be viewed in some aspects as variation of flex mounting plate 100 that allows for a more compact arrangement of fastening regions 510 while providing for the same or similar flexion between the central portions and the fastening regions. The more compact arrangement can be particularly advantageous in trailers 3/4/5 that have been designed for maximum gas capacity within the volume envelope of the trailer dimensions. It has been observed by the inventors that a plurality of smaller vertically mounted tanks can increase gas capacity. In densely packed systems, the geometry of the flex mounting plate 500 can allow for a smaller footprint in comparison with flex mounting plate 100 and free up surrounding space within trailers 3/4/5 for other components of the gas transport and delivery system.

Figure 10:
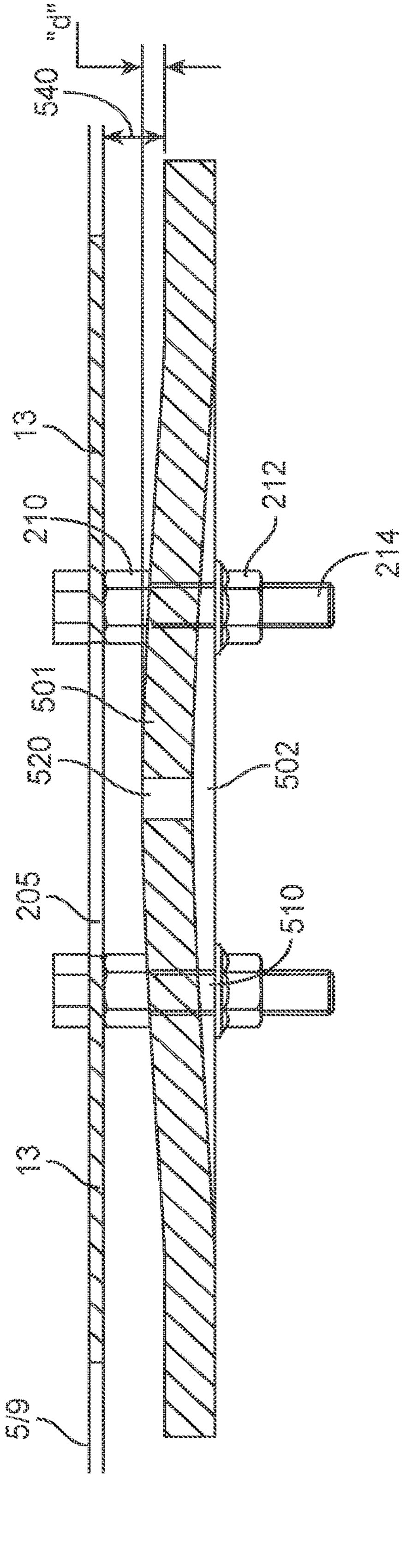
FIG. 10 shows schematically some aspects of pressurized tank retaining structures of the present disclosure.
Figure 11:
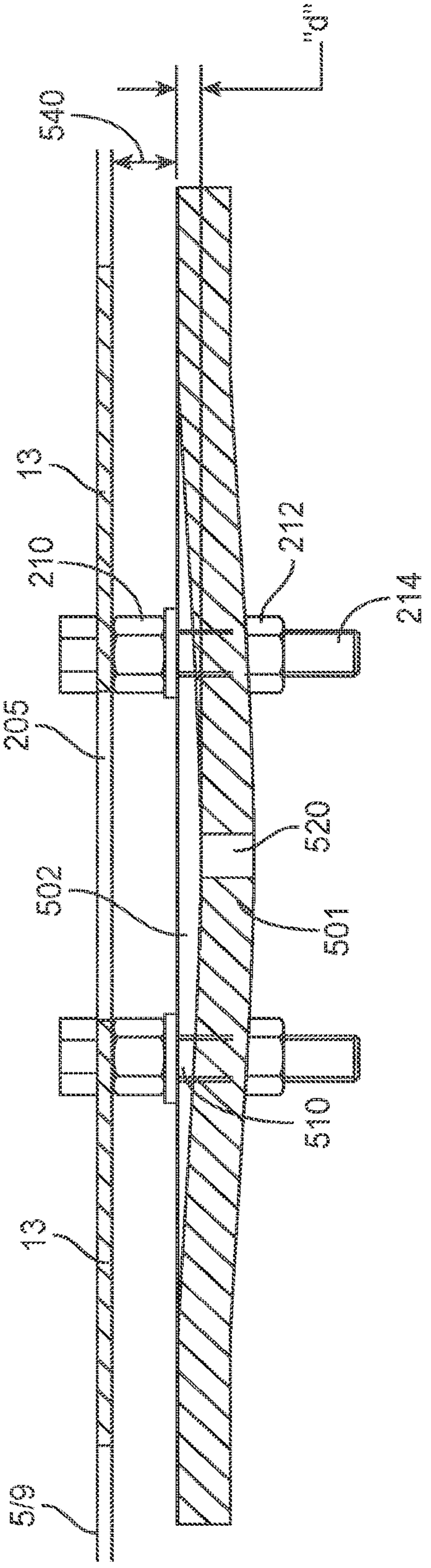
FIG. 11 shows schematically some aspects of pressurized tank retaining structures of the present disclosure.

Flex mounting plate 500 can be provided with one or more cutaway paths 505 formed from circular end-cuts 503 and linear cuts 504 in combination. One or more edge scallop cuts 532 can also be provided adjacent to the circular end-cuts 503. The combination of cutaway paths 505 and edge scallop cuts 532 can provide one or more flexion pathways 530 having a substantially consistent cross-section, illustrated by exemplary cross-section width 534 in FIG. 9C. The matching of cross-sections in a plurality of flexion pathways can improve operational life and avoid uneven wear/stress on the flex mounting plate 500 through repeated cycling of deflection/displacement as an attached tank 10 is pressurized and depressurized. When attached to a tank 10 that is expanding and contracting the flex mounting plate 500 can undergo deformation to accommodate the different distance between the frame system 5 or 9 and the tank collar in the floating end 7 or 12. A mounting portion 502 nearest the fastening regions 510 will remain at a fixed distance relative to the mounting frame portions 13 to which they are fastened. The central flexing portion 501 nearest the mounting feature 520 can move out of the same plane as the mounting portion 502 through a bending deflection. FIGS. 10 and 11 show aspects of flex mounting plate 500 in use, in a view along section A-A of FIG. 9A. In FIGS. 10 and 11 the connection to the tank collar of tank 10 has been omitted for clarity and ease of viewing. In use, the tank collar would be affixed and connected to the mounting feature 520 and would be in alignment with a hole 205 in center of mounting frame portions 13 of the frame system 5/9. FIG. 10 shows the configuration when the tank 10 has a lower pressure and has contracted in length along its central axis such that the tank collar of the floating end has been pulled closer to the opposing fixed end. The central portion 501 can bend away from the plane of the mounting portion 502 to provide a displacement distance "d" between the top surfaces of the portions 501/502. The fastening regions 510 and mounting portion 502 are held at a fixed distance 540 from the mounting frame portions 13 through a firm fastened connection that can include nuts 210/212, washers, and bolts or machine screws 214, with appropriate fasteners and surface treatments selected to avoid disconnections due to vibration in the system. FIG. 11 shows the configuration when the tank 10 has a higher pressure and has expanded in length along its central axis such that the tank collar of the floating end has been pushed further from the opposing fixed end. The displacement "d" between the top surfaces of portions 501/502 is in the opposing direction from that shown in FIG. 10.

The gaps 506 along linear cuts 504 between the mounting portion 502 and central flexing portion 501 can provide several advantageous functions. First, the gaps 506 can be designed to be large enough to avoid catching smaller debris such as sand and grit than can bind traditional bushing systems as described elsewhere herein. Such small debris can fall through and clear out of the gaps 506 to avoid binding and/or wear. Second, the gaps 506 can allow for some flexion in the between the portions of the flex mounting plate 500, as one or more gaps 506 are stretched open or pressed closed due to motion/force of the tank collar orthogonal to the central axis of the tank 10. In some instances, a shock or acceleration/deceleration of the tank can be stopped by the gap 506 fully closing such that the opposing walls of the gap 506 are compressed together as a hard-stop to stabilize the tank 10. In some implementations brush or skirt features can be provided to prevent ingress of material/debris into the gap 506.

Different connection systems can be used between the mounting plate 500 and the mounting frame portions 13 of the frame systems 5/9. Any connection system and components thereof can be selected that provides for solid and reliable fixation between the mounting frame portions 13 and the fastening regions 510.

In implementations of the present disclosure different connections can be used between the tank collar, typically a cylindrical feature, and the mounting feature 520 of the flex mounting plate 500.

Figure 12:
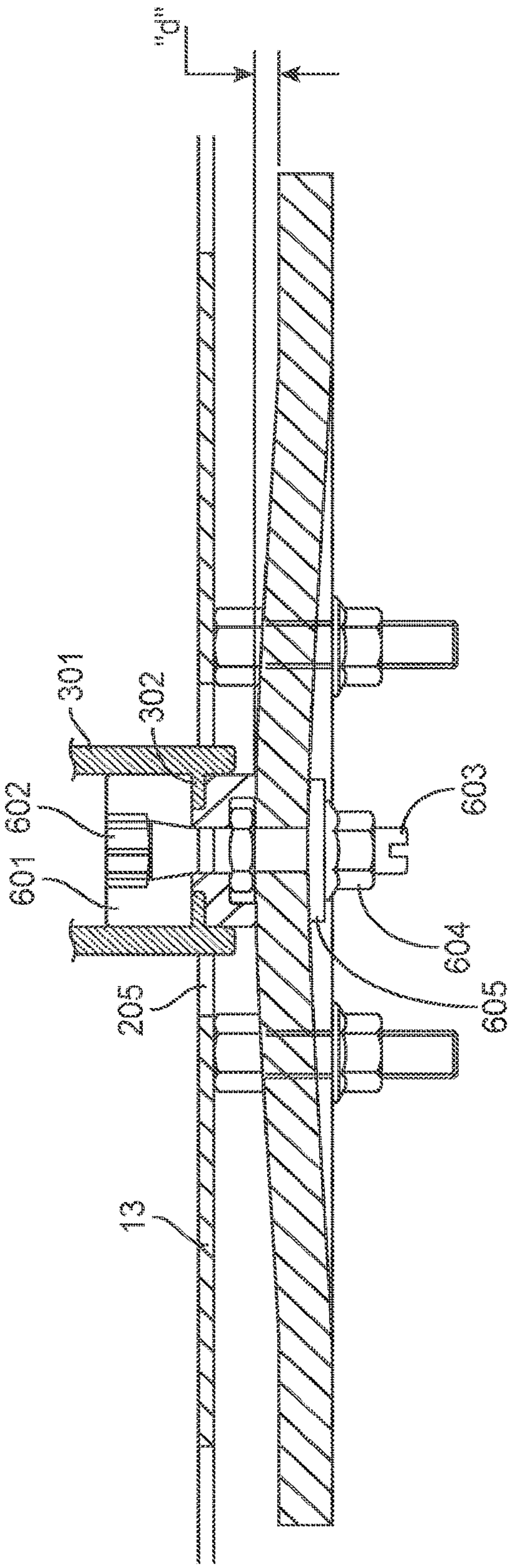
FIG. 12 shows schematically some aspects of pressurized tank retaining structures of the present disclosure.

In certain implementations, aspects of which are shown in FIG. 12, the tank collar 301 can be provided with a protruding feature 302 that extends inwards from the interior wall of the hollow cylindrical bottom opening of the tank collar 301. FIG. 12 shows a cutaway section view along section A-A of FIG. 9A and FIG. 13. The protruding feature 302 mates with an expandable plug 601 that is expanded by tightening a pin feature 603 that pulls down an expander element 602 to force portions of the expandable plug 601 outwards within the interior volume of the tank collar 301. The tank collar 301 can move freely through the hole 205 in center of mounting frame portions 13 of the frame system 5/9. In assembly, the expandable plug 601 can be attached to the mounting feature 520 of the flex mounting plate through the use of threading features on the opposing end of the expandable plug 601, onto which fastening elements can be attached, such as one or more washers 605 and nut 604. The expandable plug 601 can be inserted upwards through the opening of the tank collar 301, sliding past the protruding feature 302 in an unexpanded state. After insertion, the pin feature 603 can be tightened to pull down expander element 602. One or more adhesive materials can be used to strengthen the connection in some implementations.

Figure 13:
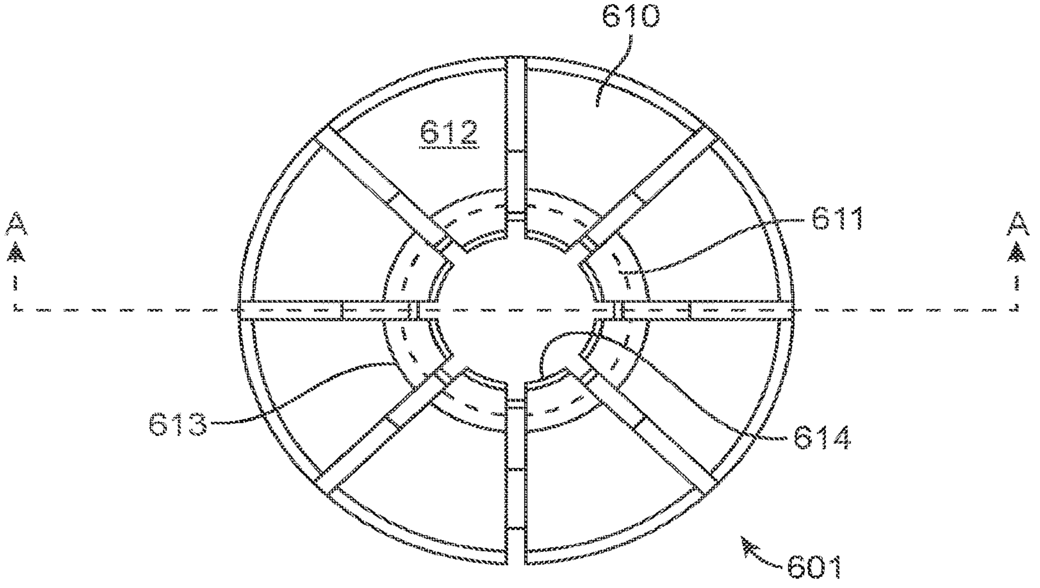
FIG. 13 shows schematically some aspects of pressurized tank retaining structures of the present disclosure.

FIG. 13 shows aspects of an implementation of the expandable plug 601. Expandable plug can be provided with a plurality of segments 610 separated by kerf cuts that allow for the expansion or contraction of the segmented portion. An angled surface 611 can be provided between top inner edge 613 and bottom inner edge 614, with the angled surface 611 providing for the expansion force as expander element 602 (not shown in FIG. 13) is pulled downwards along the angled surfaces 611 of the segments 610. The segments 610 are thereby expanded outwards and can extend over the protruding feature 302 of the tank collar 301 for engagement between the components.

In some implementations the connection system shown in FIGS. 12-13 can further include an external tank collar feature, such as a nut, that compresses on the exterior surface of the tank collar 301. The compression of the exterior surface can further improve the engagement between the protruding feature 302 and the plug 601. In alternative implementations, the plug 601 can be provided without expanding features and the tank collar 301 can be compressed from the exterior surface to provide an engagement between the components. In certain implementations, the tank collar 301 can be provided with one or more notches or kerf cuts to provide greater contraction under compression on the exterior surface.

Figure 14:
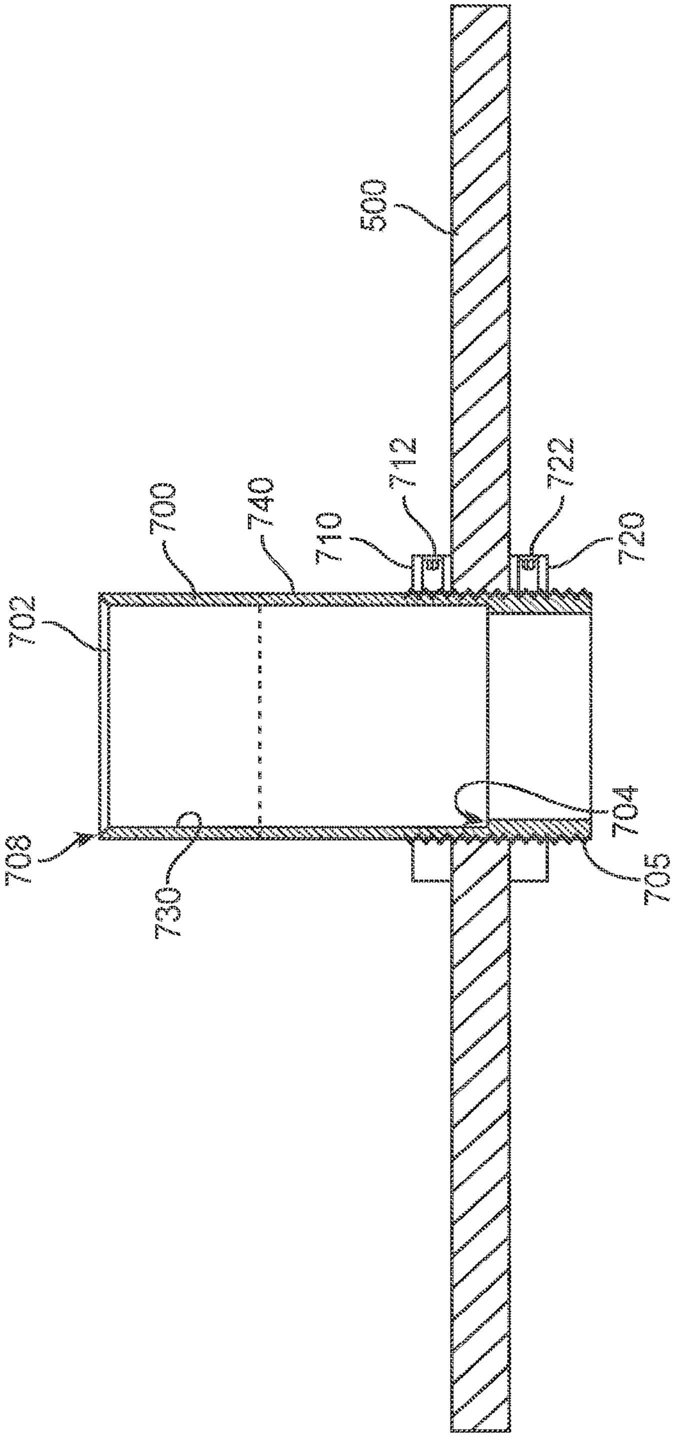
FIG. 14 shows schematically some aspects of pressurized tank retaining structures of the present disclosure.
Figure 15:
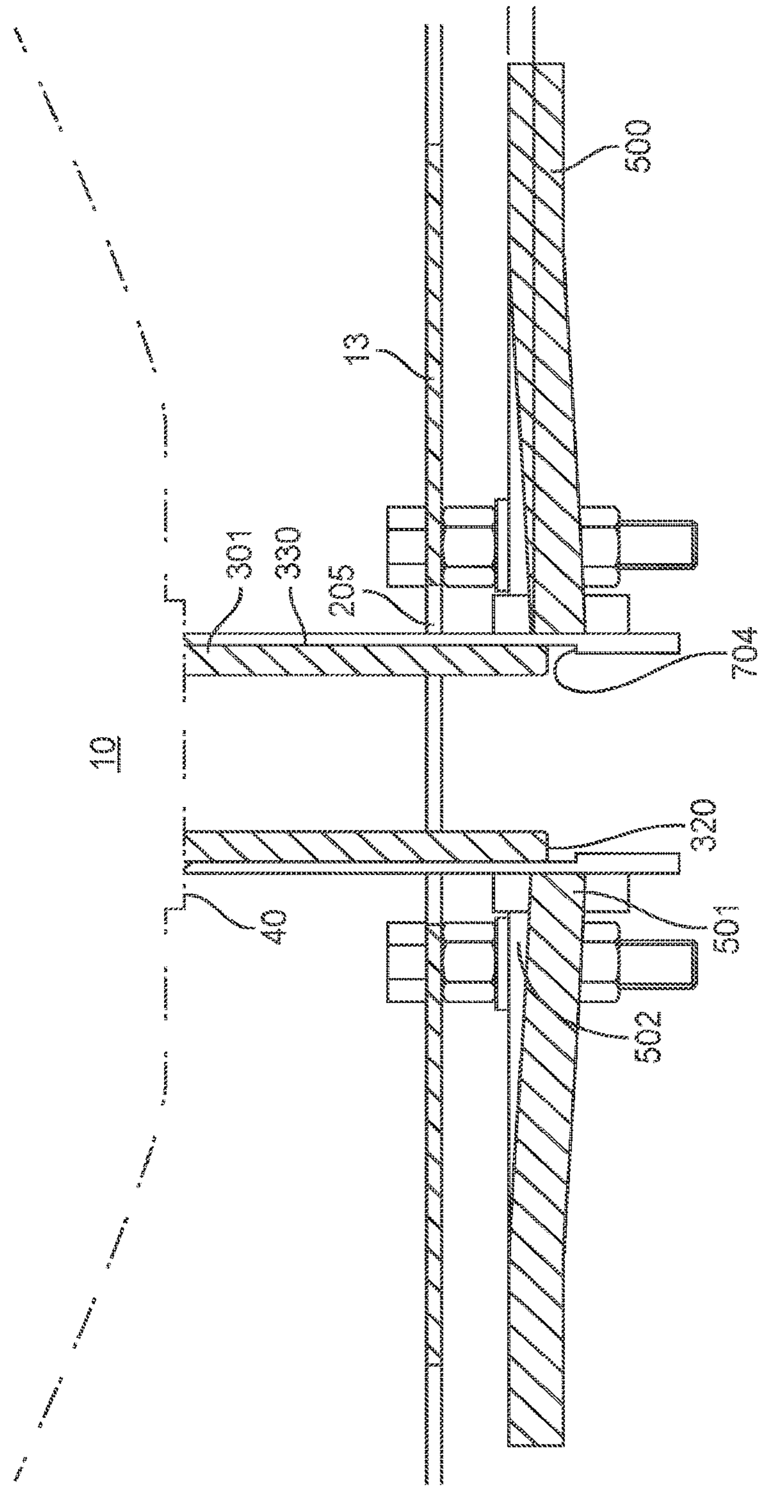
FIG. 15 shows schematically some aspects of pressurized tank retaining structures of the present disclosure.

In some implementations, aspects of which are shown in FIGS. 14 and 15, a sleeve 700 is used to connect the tank collar 301 to the flexible mounting plate 500. Sleeve 700 can have an interior surface 730 accessible by a hole 702 at one end of the sleeve 700, which has a top surface 708. Threading 705 can be provided around the exterior surface of the opposite end of the sleeve 700. Two nuts 710 and 720 can be provided to engage with the threading 705 and secure the sleeve 700 to the mounting feature 520 of the flex mounting plate 500. Mounting feature 520 can be sized as a clearance hole relative to the diameter of threading 705. Nuts 710 and 720 can be provided with set screw 712 and 722 that can be used to improve the resistance of the connection to vibrational loosening over time. Surface coatings such as threadlock agents can also be provided in some implementations along threading 705 to maintain the position of the nuts 710 and 720. An interior lip 704 can be provided within the interior surface 730 of the sleeve 700. In some implementations the bottom surface 320 of a tank collar 301 can engage with the interior lip 704 (a gap is shown between the bottom surface 320 and interior lip 704 in FIG. 15, but those elements can be flush in certain implementations). In use, tank collar 301 can be inserted into the hole 702 so that an engagement surface connection 330 is formed along the interior surface 730 of sleeve 700. A bonding agent, such as an epoxy or adhesive such as a cyanoacrylate can be used to form a bond along the engagement surface connection 330. In some implementations a flush engagement can be provided between the top surface 708 of the sleeve 700 and a flat surface 40 on the bottom of the tank 10 around the tank collar 301.

Figure 16:
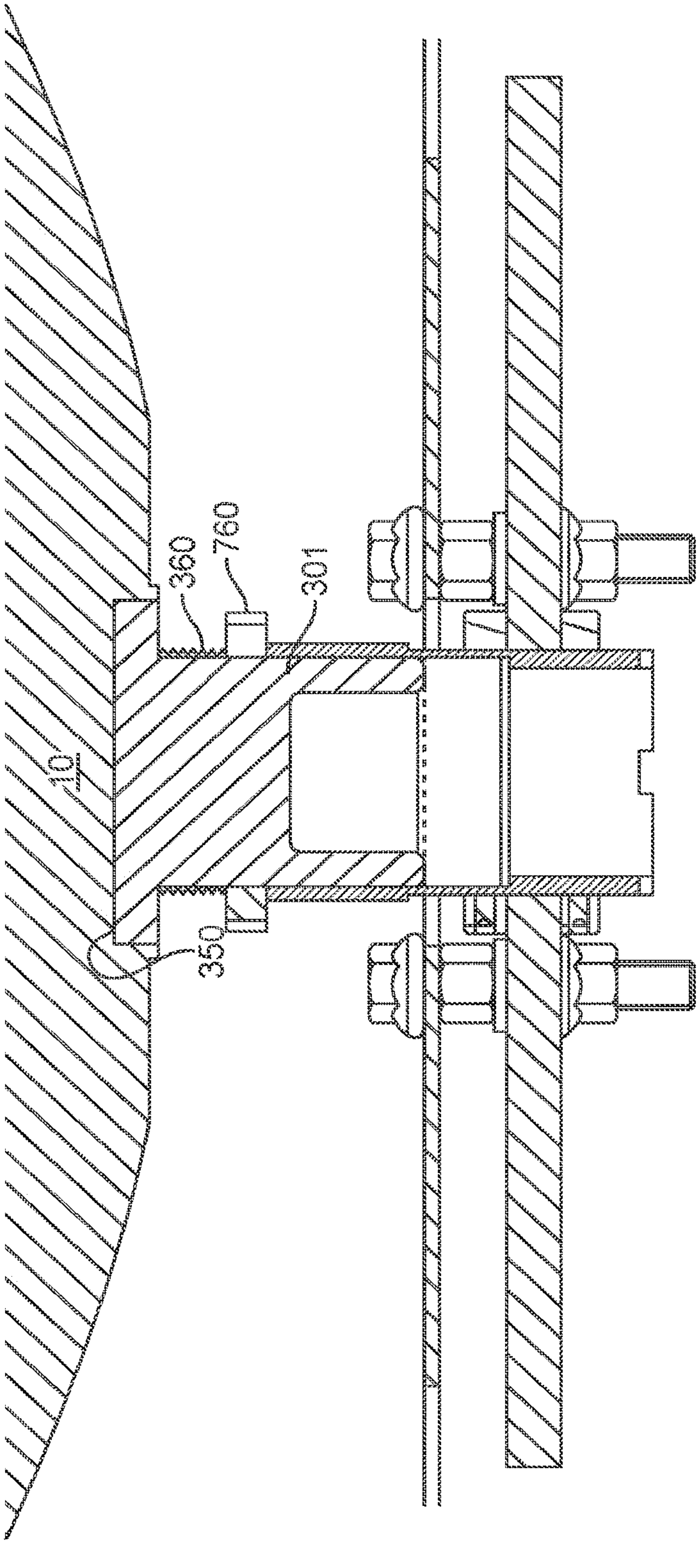
FIG. 16 shows schematically some aspects of pressurized tank retaining structures of the present disclosure.

In certain implementations of the disclosure, a threaded connection can be provided between the tank collar and a variation of sleeve 700. The variant of sleeve 700, seen in FIG. 16, can be provided with threading on the interior surface 730 of the upper portion of sleeve 700. Corresponding threading can be provided on the exterior surface 360 the tank collar 301. A nut 760 can be provided to be used as a jam nut to aid in the fastening of the connection. The tank collar 301 can be provided as an adapter component that interfaces with the bottom end of tank 10 at interface 350, details of which are not shown herein. In alternative implementations, not shown, the sleeve 700 can be omitted and an extended tank collar 301 can be used with threading along the exterior surface 360 that acts as threading 705 to fasten nuts 710 and 720 around the flex mounting plate 500. The use of a sleeve 700 can be preferable in some implementations as it is more easily replaceable than an adapter component tank collar 301, and a permanently installed tank 10 with tank collar 301 can have multiple sleeves 700 installed and uninstalled for use with different versions of, or replacement, flex mounting plates 500.

Figure 17:
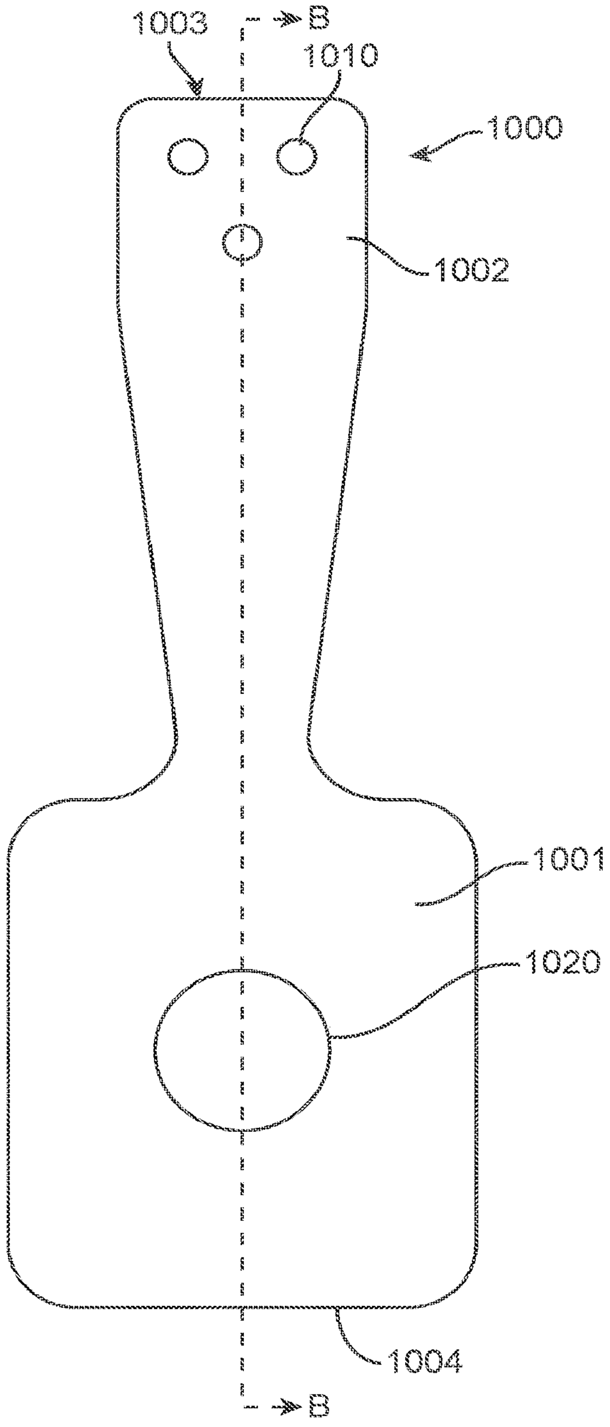
FIG. 17 shows schematically some aspects of an implementation of a mounting plate of the present disclosure.
Figure 18:
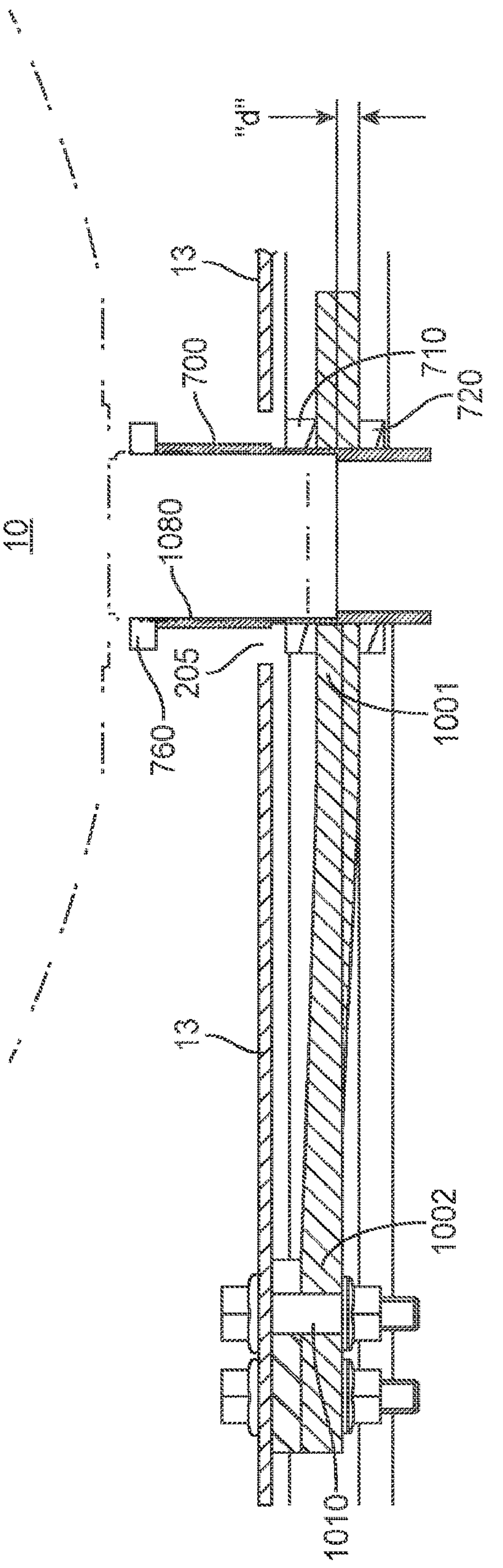
FIG. 18 shows schematically some aspects of pressurized tank retaining structures of the present disclosure.

In some implementations of the present disclosure, a flex mounting plate 1000 can be used. Aspects of flex mounting plate 1000 are shown in FIG. 17 and FIG. 18. Flex mounting plate 1000 can be used in the floating ends 7 and 12 in connection with the frame systems 5 and 9 described elsewhere herein. Flex mounting plate 1000 can in line with a void in a frame system that is in line with the tank collar of a cylindrical tank 10, such that a flexing portion 1001 around a mounting feature 1020 of flex mounting plate 1000 can be displaced relative to mounting portions around fastening regions 1010. In certain implementations, such as the embodiment shown in FIG. 17, the mounting feature 1020 can be provided nearer one end 1004 of the flex mounting plate and all fastening regions 1010 can be provided at an opposite end 1003, such that the flex mounting plate has no resistance to flexure provided on the end 1004 opposite the mounting portion 1002 at end 1003. Flex mounting plate 1000 can be viewed in some aspects as variation of flex mounting plate 100 that allows for a more compact arrangement of fastening regions 1010 in a region remote from the void in the frame system in line with the tank collar. The flex mounting plate 1000 can be advantageous in use with horizontally mounted tanks 10 in a floating end 12 in frame system 9 as described elsewhere herein. Flex mounting plate 1000 can be connected to the floating end of a tank 10 along a connection 1080 analogous to the connections described with reference to FIGS. 14-16. In some implementations a bonded connection is used for connection 1080, as described with reference to FIGS. 14-15. In other implementations, a threaded connection can be used for connection 1080 as described with reference to FIG. 16. For both types of connections, a sleeve 700 or variant thereof can be used and connected to flex mounting plate 1000 through the use of nuts 710 and 720 as described above with reference to implementations of sleeve 700. In other implementations, as sleeve 700 can be omitted and an extended tank collar 301 can be used with threading along the exterior surface 360 that acts as threading 705 to fasten nuts 710 and 720 around the flex mounting plate 1000. The use of a sleeve 700 can be preferable in some implementations as it is more easily replaceable than an adapter component tank collar 301, and a permanently installed tank 10 with tank collar 301 can have multiple sleeves 700 installed and uninstalled for use with different versions of, or replacement, flex mounting plates 1000.

The present disclosure provides for methods of mounting a load to a frame system using the components described herein. The load can be a pressurized tank having an end that is secured as a floating end such that expansion and contraction of the tank will move the floating end relative to the frame system. The methods can include providing a flex mounting plate having a mounting feature, attaching a sleeve to the mounting feature such that no relative motion between the sleeve and the mounting feature can occur, and connecting the sleeve to a tank collar on the tank such that no relative motion between the sleeve and the tank collar can occur. In some implementations the sleeve and tank collar are bonded together. In other implementations the sleeve and the tank collar are connected with a threaded engagement. In other implementations, the methods can include providing a flex mounting plate having a mounting feature, attaching an expandable plug to the mounting feature such that no relative motion between the expandable plug and the mounting feature can occur, and connecting the expandable plug to a tank collar on the tank such that no relative motion between the expandable plug and the tank collar can occur. In some implementations the expandable plug is connected to the tank collar via engagement with a protrusion within the tank collar by expanding the expandable plug by tightening a pin feature that pulls an expander element into a segmented portion of the expandable plug.

It is to be appreciated that certain features of the disclosure which are, for clarity, described herein in the context of separate exemplar, may also be provided in combination in a single exemplary implementation. Conversely, various features of the disclosure that are, for brevity, described in the context of a single exemplary implementation, may also be provided separately or in any subcombination. Further, reference to values stated in ranges include each and every value within that range.

What is claimed:

1. A method of mounting a tank to a frame system, the method comprising:

providing a flex mounting plate having a mounting feature, attaching a sleeve to the mounting feature such that no relative motion between the sleeve and the mounting feature can occur, and connecting the sleeve to a tank collar on the tank such that no relative motion between the sleeve and the tank collar can occur.

2. The method of claim 1, further comprising connecting the sleeve and the tank collar with a threaded engagement.

3. The method of claim 2, further comprising bonding the sleeve and tank collar together.

4. The method of claim 1, further comprising the tank collar is an adapter configured to interface with the bottom end of tank.

* * * * *